United States Patent
Sugano

(10) Patent No.: US 6,816,276 B2
(45) Date of Patent: Nov. 9, 2004

(54) EFFICIENTLY SCHEDULED MULTIPLE RASTER IMAGE PROCESSORS

(75) Inventor: Takashi Sugano, Cupertino, CA (US)

(73) Assignee: Electronics for Imaging, Inc., Foster City, CA (US)

( * ) Notice: Subject to any disclaimer, the term of this patent is extended or adjusted under 35 U.S.C. 154(b) by 374 days.

(21) Appl. No.: 09/803,395

(22) Filed: Mar. 8, 2001

(65) Prior Publication Data

US 2002/0163664 A1 Nov. 7, 2002

(51) Int. Cl.⁷ .............. G06K 15/00; G06F 13/00; G06F 3/12
(52) U.S. Cl. ................... 358/1.15; 358/1.13
(58) Field of Search ............ 358/1.1–1.9, 1.11–1.18; 345/501, 502, 505, 506; 709/102, 319, 328, 103, 321, 329, 201, 322; 717/120

(56) References Cited

U.S. PATENT DOCUMENTS

| | | | |
|---|---|---|---|
| 5,113,494 A | 5/1992 | Menendez et al. | 395/163 |
| 5,337,258 A * | 8/1994 | Dennis | 714/47 |
| 5,473,741 A | 12/1995 | Neufelder et al. | 395/137 |
| 5,594,860 A | 1/1997 | Gauthier | 395/501 |
| 5,596,416 A | 1/1997 | Barry et al. | 358/296 |
| 5,619,624 A * | 4/1997 | Schoenzeit et al. | 345/418 |
| 5,652,711 A | 7/1997 | Vennekens | 364/514 |
| 5,704,020 A * | 12/1997 | Hanyu et al. | 358/1.2 |
| 5,760,775 A | 6/1998 | Sklut et al. | 345/349 |
| 5,768,483 A | 6/1998 | Maniwa et al. | 395/114 |
| 5,784,077 A | 7/1998 | Silverbrook | 347/2 |
| 5,790,119 A | 8/1998 | Sklut et al. | 345/349 |
| 5,828,814 A | 10/1998 | Cyman et al. | 395/102 |
| 5,883,722 A | 3/1999 | Bäumler | |
| 6,105,101 A * | 8/2000 | Hester et al. | 710/260 |

FOREIGN PATENT DOCUMENTS

| | | | |
|---|---|---|---|
| EP | 0 578 258 A1 | 1/1994 | |
| EP | 562 045 | 8/1996 | B41C/1/05 |
| EP | 733 965 | 9/1996 | G06F/3/12 |
| EP | 790 548 | 8/1997 | G06F/3/12 |
| EP | 875 853 | 11/1998 | G06T/1/20 |
| EP | 875 854 | 11/1998 | G06T/1/20 |
| EP | 875 855 | 11/1998 | G06T/1/20 |

* cited by examiner

*Primary Examiner*—King Y. Poon

(57) ABSTRACT

A method of printing multi-page documents with multiple raster-image processors (RIP's), the method comprising the steps of profiling the command stream complexities and resource dependencies of a series of pages to be printed. Then, associating a profile of the command stream complexities and resource dependencies of a series of pages to be printed with a printing command stream. And dispatching individual raster-image processor jobs for each of the pages to be printed to particular RIP's according to the profile. The step of dispatching is preferably such that the complexity estimates and the dependency list are used to minimize idle times for the RIP's. A further step of collecting is done in which the individual outputs of each raster-image processor are recombined into a page-ordered sequence for a print engine.

5 Claims, 1 Drawing Sheet

EFFICIENTLY SCHEDULED MULTIPLE RASTER IMAGE PROCESSORS

BACKGROUND OF THE INVENTION

1. Technical Field

The present invention relates to computer printing systems, and more particularly to scheduling multiple raster image processors such that the idle times are reduced.

2. Description of the Prior Art

Page description language (PDL) is an efficient way to describe the objects that are to be printed by a computer on a piece of paper. So-called PDL files are typically serially communicated to an intelligent printer that has a rendering engine that converts the PDL into bitmap images or pagemaps. This particuilar task is known as raster-image processing (RIP).

A POSTSCRIPT printer description (PPD) file is a text file that describes the printer features unique to particular printers in particular environments. Ubiquitous POSTSCRIPT printer driver executable program files are used to communicate with printers. These usually assume a generic printer is present with ordinary features and capabilities, e.g., a lowest common denominator default. Each PPD file contains fragments of POSTSCRIPT code that a POSTSCRIPT printer driver can import to make use of a printer's unique features. In a WINDOWS environment, PPD files load from the driver into the \WINDOWS\SYSTEM subdirectory.

A PPD file is not a printer driver. It is an information file, in ASCII format, that is used by a printer driver loaded by an operating system. Since PPD's are all written in an ASCII-text format, they are not limited to a specific software environment or platform. An ASCII-text PPD file can therefore be used equally well in Windows, MAC-OS, and UNIX environments, and by a variety of software applications. Adobe Systems, Inc. (Sunnyvale, Calif.) has defined how PPD files must be constructed by printer and software vendors in the "PPD Specification," now at version 4.2.

PPD files are used when printing to POSTSCRIPT devices. The PPD's are written by the printer's manufacturer to supply characteristic information about a particular printer, e.g., the standard features of the printer, the amount of memory available, any predefined paper sizes, any resident fonts, any resolution capabilities, and any optimized screen sets. When armed with such information, applications like Adobe PageMaker can very efficiently communicate special commands and structures to the printer for special effects and/or higher speed operation.

For example, fonts that are listed as already being resident in the printer can be skipped in a routine download of fonts. So the time needed to download fonts can be saved. Printing by using these PPD files enables PageMaker's new printing features to be used to advantage. PageMaker 5.0x can read PPD Specification 3.0 files, included with PageMaker 4.2. PageMaker 5.0x can also read PPD Specification 4.1 files, although PageMaker cannot read the new keywords these PPD files support. PPD files describe a printer's standard configuration, provided by the printer manufacturer. More detailed information about a particular printer can be supplied to PageMaker by modifying the PPD information with a supplement file, called a custom printer file. If additional printer memory (RAM) or fonts are in a printer, supplementing the PPD file with this information can reduce the print times. PageMaker can determine what it needs to print based on the actual amount of virtual memory (VM) or fonts available. When printing, PageMaker reads the information in the custom printer file before reading the PPD file.

If there is more than one page to be printed by a printer, such pages must be output in the correct order. When there is only one raster-image processor, it makes sense to RIP the first page first, the second page second, the third page third, etc. The raster-image processed pages are then sent to the printer engine in order.

A pipelined raster-image processor is described by Juan Menendez, et al., in U.S. Pat. No. 5,113,494, issued May 12, 1992. A bus is used with separate image processing components, e.g., a scaler, a decompressor, interfaces, etc. Each component can essentially process separate image-processing tasks in parallel. The problem with this system is only one raster-image processor is availaible, albeit a very efficient one. Multiple-page jobs can become RIP-bound.

One approach to printing multiple-page jobs faster is described by Michael Barry, et al., in U.S. Pat. No. 5,596,416, issued Jan. 21, 1997. A single input image device and image distributor were used to drive multiple print engines. These then all were managed to feed a combiner for output. The print engines could then work on a multi-page job in parallel. This works fine when the bottleneck in printing speed is the print engine, but if the limitation is in raster-image processing resources then not much advantage is gained.

Pierre Vennekens describes page description language and raster image processing in both European Patent Application EP-0-733-965-A1, published Sep. 25, 1996, and U.S. Pat. No. 5,652,711, issued Jul. 29, 1997. Such describe the use of several parallel processors to improve the throughput of printing jobs. Pierre Vennekens therefore is describing a conventional multi-RIP system.

Multi-RIP systems were supposed to make printing jobs go faster by adding additional raster-image processors. The idea was that several pages could be worked-on in parallel by several parallel raster-image processors. What prevented this from working as well as was expected was the fact that some pages being printed demand more resources than do others. Some pages are also not independent, they need resources that can only be obtained from the pages that preceed them. For example, fonts that were downloaded with the prior page. In a parellel raster-image processoring environment, the needed prior page may be in progress in parallel in another raster-image processor. So the the first raster-image processor must wait, or idle, until the prior page's resource becomes available.

Thomas Neufelder describes a system for estimating raster-image processing times in U.S. Pat. No. 5,473,741, issued Dec. 5, 1995. Timing data profiles are used to estimate the actual time for raster-image processing of a PDL-file without committing to do the processing. The raster-image processing jobs can then be costed and scheduled according the processing time that will be required.

SUMMARY OF THE INVENTION

A method embodiment of the present invention provides for printing multi-page documents with multiple raster-image processors (RIPs). The method comprises profiling the command stream complexities and resource dependencies of a series of pages to be printed. Then, associating a profile of the command stream complexities and resource dependencies of a series of pages to be printed with a printing command stream. And dispatching individual raster-image processor jobs for each of the pages to be printed to particular RIPs according to the profile. The step of dispatching is preferably such that the complexity estimates and the dependency list are used to minimize idle times for the RIPs. A further step of collecting is done in which the individual outputs of each raster-image processor are recombined into a page-ordered sequence for a print engine.

DETAILED DESCRIPTION OF THE INVENTION

Figure 1:
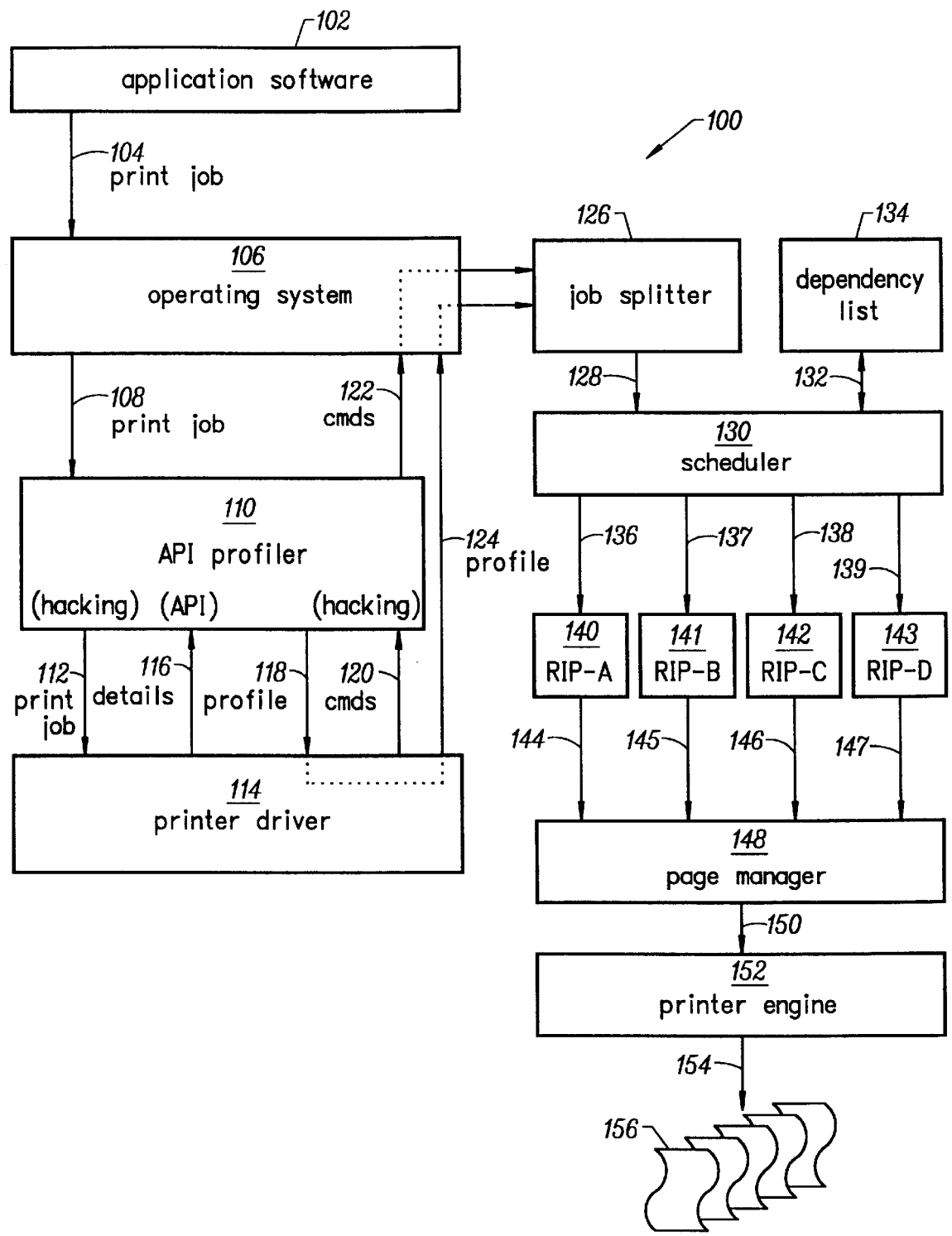
FIG. 1 is a functional block diagram of a printing system embodiment of the present invention.

FIG. 1 represents a printing system embodiment of the present invention, referred to herein by the general reference numeral 100. The printing system 100 is used with an application software program 102 that can periodically issue multi-page print job requests 104 to an operating system 106. For example, the application software program 102 can be similar to Microsoft WORD, Adobe ILLUSTRATOR, Adobe PAGEMAKER, etc. The operating system 106 can be similar to Microsoft WINDOWS, Apple Computer MAC/OS, UNIX, etc.

The operating system 106 forwards all the information to print all the pages of a print job 108. Such is intercepted by a profiler 110 which includes an incoming hacking function and an outgoing hacking function. The print job can include a request to draw graphics to a printer and is passed on as a print job 112 to a printer driver 114. If the printer driver supports a profiler application program interface (API), very accurate and detailed profile information 116 is provided back to the profiler 110. A page profile 118 summarizes the resources needed by particular pages and is appended at the page end. A command stream 120 for drawing the text and graphics objects on the pages is generated by the printer driver 114. The implementation of the profiler 110 can be assisted by referring to the description for a system for estimating raster-image processing times in U.S. Pat. No. 5,473,741, issued Dec. 5, 1995, to Thomas Neufelder. Such patent is incorporated herein by reference.

An application program interface (API) is a set of tools that allows programmers to write applications that let one computer operating system or program make requests of another, different operating system or program. Such bridge between operating systems or programs can integrate otherwise incompatible systems. A wide range of services may be required of an API to support applications. These services include procedures, operations, shared data objects, resolution of identifiers. An API can be contrasted with a graphical user interface (GUI) or a command interface, both of which are direct user interfaces. Information flows across an API boundary in a format defined by the particular programming language, and lets users access the services provided by the application on the other side of the boundary. Such requires mapping the specification of the functions available at the application platform into the syntax of the programming language.

A command stream 122 and a corresponding profile 124 are sent page-by-page through the operating system 106 to a job splitter 126. These are combined into a composite stream 128 for a page job-scheduler. Any page dependencies 132 are stored in a list 134, e.g., a third page depends on resources in the second page. The scheduler 130 determines which of several raster-image processors should receive the job of processing particular pages, given the page dependencies held in the dependency list 134. The objective of the scheduling is to have the fastest throughput of the printed pages that is possible.

The scheduler 130 parses the print job into four streams 136–139, one for each of a raster-image processor 140–143. Individual bitmap streams 144–147 are then combined into proper page order by a page manager 148. A rendered page stream 150 is then sent to a printer engine 152. An output 154 will then produce the requested printed pages 156.

The profiler 110 inserts a profile for each page at the end of the command stream for the page. Each profile includes a description of the command stream complexity, and a list of any resource dependencies. A complex command stream can slow down the raster-image processing by loading down the central processing unit (CPU) with compute-intensive tasks. Resource dependencies can slow down and even halt the raster-image processing by making it execute null instructions in a wait loop. The profiler estimates the raster-image processing time for the command streams, and lists the resource dependencies. The scheduler then uses the profiler data to dispatch the pages to be raster-image processed.

One policy the scheduler 130 may follow when the dependencies list 134 says one page depends on another, is not to sequentially dispatch the raster-image processing in parallel to two different RIP's 140–143. An example is represented in Table I where there are only two RIP's. If page-2 depends on resources from page-1, and page-3 and page-4 are independent, then the scheduler should send page-1 to the first RIP, and page-3 to the second RIP. Once these are finished, page-2 can be sent to the first RIP and page-4 to the second RIP. Page-1 can print in time slot 3, but page-2 must finish in RIP-1 and then print in time-slot 3 before page-3 can print in time slot 4. Such recombining and ordering is done by the page manager 148. The ordering in Table I minimizes the idle times that will be experienced by the RIP's.

TABLE I

| | time slot 1 | time slot 2 | time slot 3 | time slot 4 | time slot 5 |
|---|---|---|---|---|---|
| RIP-1 | page-1 | page-2* | | | |
| RIP-2 | page-3 | page-4 | | | |
| print engine | | page-1 | page-2 | page-3 | page-4 |

*depends on page-1

Table II represents an instance where page-3 is relatively complex, and all of the pages are independent. The processing of page-3 can preferably be begun immediately because it will take as much time for RIP-2 to process it than RIP-1 will take to process all the other pages one after the other. Such policy minimizes the idle times that will be experienced by all the RIP's.

TABLE II

| | time slot 1 | time slot 2 | time slot 3 | time slot 4 | time slot 5 |
|---|---|---|---|---|---|
| RIP-1 | page-1 | page-2 | page-4 | | |
| RIP-2 | | page-3 | | | |
| print engine | | page-1 | page-2 | page-3 | page-4 |

In some embodiments of the present invention, one of the RIP's 140–143 could be implemented to be more capable and faster executing than the others, e.g., to save on manufacturing costs. The complexity estimates could then be used to send the complex processing jobs to this more capable RIP.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

What is claimed is:

1. Apparatus for use with a plurality of raster-image processors for converting page description language commands into a bitmap for a printer engine, the apparatus comprising:

a profiler for receiving a multiple-page print job from a computer application program and operating system, the profiler adapted to generate a page profile for each of the pages, wherein each page profile comprises an estimate of the raster image processing time for the page;

a printer driver adapted to receive the print job and the page profiles from the profiler, generate therefrom a command language stream for each of the pages, and provide the command language streams for all of the pages back to the profiler;

a job splitter adapted to receive the command language streams from the profiler and the page profiles from the printer driver, and to generate therefrom a composite command language stream for all of the pages;

a scheduler adapted to receive the composite command language stream and extract therefrom the time estimates for each of the pages and dispatch individual print-page raster-image processor jobs to particular raster image processors depending on the time estimates, each raster image processor providing an individual bitmap stream; and a page manager adapted to combine the individual bitmap streams in a proper page order and send the combined bitmap stream to the printer engine for printing.

2. The printing system of claim 1, wherein the scheduler is adapted to use the time estimates to minimize idle times for the raster image processors.

3. The printing system of claim 1, wherein the profiler comprises an application program interface that is adapted to receive detailed profile information from the printer driver.

4. A method for use with a plurality of raster-image processors for converting page description language commands into a bitmap for a printer engine, the method comprising:

providing a profiler for receiving a multiple-page print job from a computer application program and operating system, the profiler adapted to generate a page profile for each of the pages, wherein each page profile comprises an estimate of the raster image processing time for the page;

providing a printer driver adapted to receive the print job and the page profiles from the profiler, generate therefrom a command language stream for each of the pages, and provide the command language streams for all of the pages back to the profiler;

providing a job splitter adapted to receive the command language streams from the profiler and the page profiles from the printer driver, and to generate therefrom a composite command language stream for all of the pages;

providing a scheduler adapted to receive the composite command language stream and extract therefrom the time estimates for each of the pages and dispatch individual print-page raster-image processor jobs to particular raster image processors depending on the time estimates, each raster image processor providing an individual bitmap stream; and providing a page manager adapted to combine the individual bitmap streams in a proper page order and send the combined bitmap stream to the printer engine for printing.

5. The method of claim 4, wherein dispatching further comprises using the time estimates to minimize idle times for the raster image processors.

* * * * *